United States Patent Office 3,346,622
Patented Oct. 10, 1967

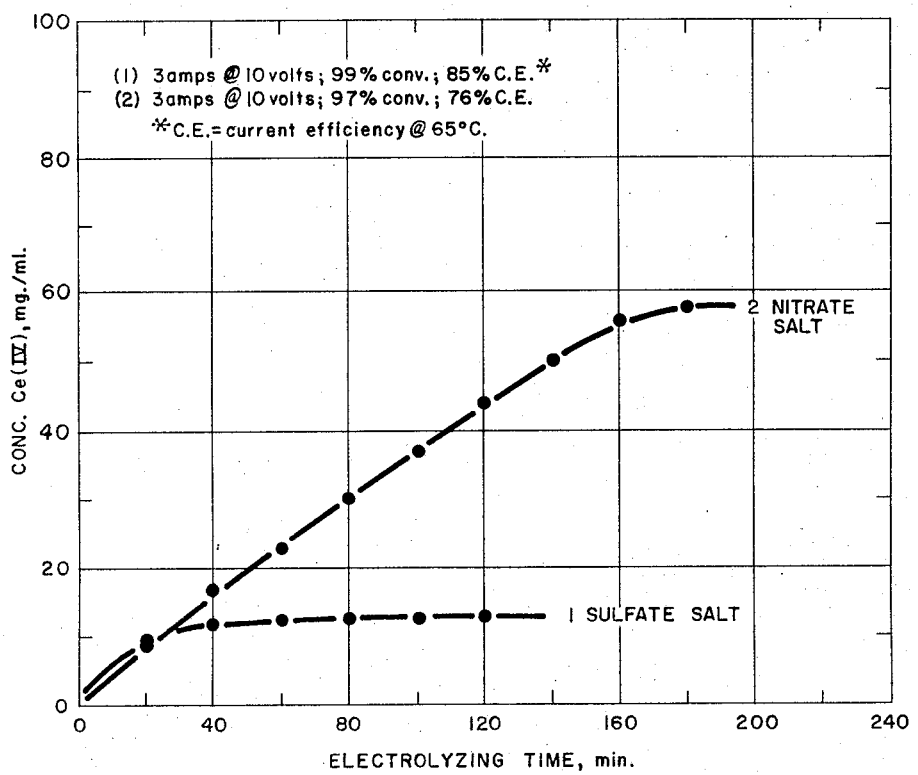

3,346,622
PREPARATION OF AN AROMATIC ESTER FROM AN ALKYL-AROMATIC COMPOUND AND A CARBOXYLIC ACID IN THE PRESENCE OF A TETRAVALENT CERIUM SALT AND AN INHIBITOR
Charles M. Selwitz, Pitcairn, and Edmond R. Tucci, Ross Township, Allegheny County, Pa., assignors to Gulf Research & Development Company, Pittsburgh, Pa., a corporation of Delaware
Filed July 15, 1965, Ser. No. 472,084
20 Claims. (Cl. 260—488)

This invention relates to an improved process for the selective production of esters.

It is an object of this invention to increase the selectivity of the production of esters by the reaction of selected alkylaromatics with organic acids in the presence of defined cerium salts by suppressing the formation of unwanted side products, such as condensation products.

In accordance with the invention, an improved process for the selective production of an ester which comprises contacting at least one alkylaromatic which contains at least one alpha-hydrogen atom and wherein the alpha-carbon atom is saturated with a promoter comprising a tetravalent cerium salt which has a water solubility at 25° C. of at least 0.05 gram per 100 grams of water and a monobasic organic acid having from 2 to 10 carbon atoms per molecule under esterification conditions and in the presence of an inhibitor selected from the group consisting of water and a soluble salt of an organic acid.

The charge stock for the process of this invention can be any alkylaromatic having at least one alpha-hydrogen atom and wherein the alpha carbon is saturated. By an alpha-hydrogen atom is meant a hydrogen attached to an alpha-carbon atom. By an alpha-carbon atom is meant a carbon atom directly connected to the aromatic ring and which is a part of an alkyl group. This alpha-hydrogen atom can be designated an "active" hydrogen atom since it is more easily extractable by the cerium than other hydrogen atoms. Any alkyl group which contains at least one active hydrogen is defined as a "reactive alkyl group" for the purpose of this invention. The preferred alkylaromatics are those having at least one alpha-hydrogen atom and wherein the alkyl groups are saturated. The alkylaromatic can have one or more rings, condensed or uncondensed, and one or more alkyl groups. The preferred alkylaromatics have between 1 and 4 rings and between 1 and 4 alkyl group substituents. The alkyl groups can have between 1 and 10 carbon atoms. The alkylaromatics can have between 7 and 50 carbon atoms, preferably between 7 and 18 carbon atoms. The alkylaromatics can be substituted on the aromatic ring with substituents selected from the group consisting of halogen, —NO$_2$ and C≡N. The alpha-carbon atom should be saturated, that is, contain no olefinic double bond between the alpha and beta-carbon atoms of the alkyl group if there is a beta-carbon atom, since these alkylaromatics, as exemplified by styrene and substituted styrenes, are thermally polymerizable under the conditions of this invention, and are therefore less desirable charge stocks.

The most preferred alkylaromatics are the (1) monoalkylaromatics represented by the general formula:

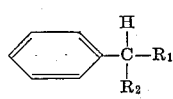

where R$_1$ and R$_2$ can be the same or different and are selected from the group consisting of hydrogen and hydrocarbon radicals having between one and 10 carbon atoms; and (2) the dialkylaromatics represented by the general formula:

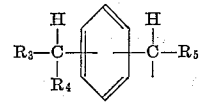

where R$_3$, R$_4$, R$_5$ and R$_6$ can be the same or different and are selected from the group consisting of hydrogen and hydrocarbon radicals having between one and 10 carbon atoms.

Examples of suitable charge stocks include toluene; o-, m- and p-xylene; ethylbenzene; propylbenzene; 1,2,3-trimethylbenzene; isopropylbenzene; 1-methyl-3-chlorobenzene; 1-methyl-4-propylbenzene; 1-methyl-3-nitrobenzene; 1-methyl-4-cyanobenzene; 2-phenyl-4-methylpentane; 1-phenylhexane; octylbenzene; 2-phenyldecane; pentadecylbenzene; 2-phenyl-3-methylpentadecane; octadecylbenzene; 9-(2-phenylethyl)-heptadecane; 3-phenyl-1-propene; 6-phenyl-1-hexene; phenylcyclobutane; 1-methylnaphthalene; tetralin; fluorene; and diphenylmethane. The most preferred charge stocks are toluene and the xylenes. Unsuitable charge stocks include, for example, 2-phenyl-2-methylpropane; 3-ethyl-3-phenylhexane; and styrene.

The esterification reaction is promoted by a tetravalent cerium salt which has a water solubility at 25° C. of at least 0.05 gram per 100 grams of water. Examples of tetravalent cerium salts useful in the process of this invention include the so-called single salts, such as ceric sulfate and ceric nitrate, and the so-called double salts, such as ceric ammonium sulfate and ceric ammonium nitrate. The ceric sulfate and ceric ammonium sulfate have solubility in water at 25° C. of at least 2 grams per 100 grams of water. The ceric nitrate and ceric ammonium nitrate are very soluble in water at 25° C. Ceric oxide is undesirable in that it is substantially inactive under the temperature conditions of the process of this invention. Ceric oxide is substantially insoluble in water at 25° C. In accordance with the above, the tetravalent cerium salts to be useful in promoting the subject reaction must have a solubility in water of at least 0.05 gram per 100 grams of water at 25° C.

The presence of a monobasic organic acid is essential to the subject reaction in order to obtain an ester product. The monobasic organic acid can suitably have from 2 to 10 carbon atoms, inclusive. Substituted acids, such as halogenated monobasic organic acids can also be used. Examples of suitable monobasic organic acids include acetic; propionic; n-butyric; isobutyric; chloroacetic; dimethylacetic; hexanoic; octanoic and decanoic acids. The monobasic organic acids having between 2 and 4 carbon atoms per molecule are preferred with the most preferred acids being the monobasic organic acids having between 2 and 3 carbon atoms, i.e., acetic and propionic acids.

It is preferred that the molar ratio of the monobasic acid to reactive alkyl groups in the alkylaromatic be between about 1:1 and 2:1, but the molar ratio can vary between 0.8:1 and 10:1, or more. For example, a 2:1 molar ratio of acetic acid to toluene is a 2:1 molar ratio of the monobasic acid to reactive alkyl groups in the alkylaromatic. On the other hand, a 2:1 molar ratio of acetic acid to p-xylene would be a 1:1 molar ratio of acetic acid to reactive alkyl groups in the alkylaromatic.

Monomeric esters are, of course, produced by the reaction of monobasic acids and a reactive monoalkylaromatic. The reaction of a monobasic acid with a di- or polyalkylated aromatic can result in a monomeric ester having a number of ester groups equivalent to the number of reactive alkyl groups on the alkylaromatic.

It has been found, in accordance with the invention, that the presence of a compound selected from the group consisting of water and a soluble salt of an organic acid in some manner suppresses or inhibits the formation of condensation products, i.e., diaryl compounds of the reactive alkylaromatics and thus improves the selectivity of the reaction to the formation of the desired esters.

The amount of water should be at least about two weight percent based on the monobasic organic acid, but less than that amount which, when added to the alkylaromatic-organic acid solution results in the formation of two immiscible liquid phases. A slight or small phase separation can be tolerated, but the reaction should be substantially a single phase reaction with respect to the organic acid, alkylaromatic and water. The preferred amounts of water are those between 50 and 100 percent of that amount of water required to saturate the hydrocarbon-acid solution, that is, result in the formation of two immiscible phases. For example, when acetic acid is used as the solvent, the preferred amounts of water are between 5 and 15 weight percent based on the acetic acid.

The salt of an organic acid must be soluble in the reaction medium since it is the greater concentration of the acid anion which is believed to result in the suppression of the diaryl compounds. Any soluble salt of an organic acid can be employed so long as the salt has a solubility of at least 0.1 mole of salt per mole of the monobasic organic acid employed. It is preferred that the concentration of salt be between 0.1 to 10 moles per mole of organic acid and more preferably between 0.5 to 4 moles of salt per mole of acid. The preferred salts are the alkali metal, alkaline earth metal and ammonium salts of monocarboxylic organic acids having between 2 and 10 carbon atoms per molecule and preferably between 2 and 3 carbon atoms per molecule. It is further preferred that the salt of the organic acid be one corresponding to the monobasic organic acid reactant to prevent mixed ester formation.

Examples of suitable salts of organic acids include, but are not limited to lithium acetate; sodium acetate; potassium acetate; rubidium propionate; magnesium acetate; magnesium butyrate; barium acetate; sodium octanoate; calcium acetate; lithium butyrate; and ammonium acetate.

It is preferred that the subject reaction be run in the absence, or substantial absence, of a gas which contains free molecular oxygen. That is, the reaction can be run at atmospheric pressure without taking any special precautions to exclude an air atmosphere with an inert gas, but it is not preferred to bubble a gas containing free molecular oxygen through the reaction medium unless oxidation products, such as aldehydes, ketones and acids are also desired.

The reaction temperature should be at least 60° C. but below the decomposition temperature of the particular tetravalent cerium salt employed which, in most cases, is below about 300° C. For example, ceric sulfate tetrahydrate decomposes at 195° C. Reaction temperatures below 60° C. are not desirable in that the reaction rate is too slow. The reaction temperature can therefore vary between 60° C. and 300° C. with preferred reaction temperatures between 70° C. and 150° C.

The reaction pressure is not critical and any pressure can suitably be employed. Atmospheric pressure is preferred for economic reasons, but pressures as high as 1,000 p.s.i.g., or more, can be used, if desired.

The contact time should be at least 30 minutes. Preferred contact times are between 1 and 10 hours. Longer contact times, for example 24 to 60 hours, or more, can be employed, if desired, however, at the longer contact times, the selectivity to the formation of the ester may be reduced due to the formation of by-products, such as aldehydes.

The tetravalent cerium salt functions in the manner of a reactant promoter. It requires the reduction of two ceric ions to cerous ions to produce one mole of ester from the reaction of a reactive monoalkylaromatic with a monobasic acid. The reduced cerous iron is inactive and must be re-oxidized back to the active tetravalent ceric state before it can further serve as a promoter. The molar ratio of tetravalent cerium salt to the reactive alkyl groups in the alkylaromatic is suitably between 0.1:1 and 10:1, and is preferably between 1:1 and 3:1.

The process of this invention is operated by simply contacting the tetravalent cerium salt with the defined alkylaromatic in the presence of the organic acid and inhibitor. The ceric salts are for the most part insoluble in the organic acids, but in some instances, such as with acetic acid, the ceric salts, such as ceric ammonium nitrate, are soluble in the reaction medium and a homogeneous reaction occurs.

Other inert liquids can be present in the reaction medium, such as paraffins, naphthenes, aromatics without side chains, or aromatics having an absence of alpha-hydrogen atoms, but compounds containing reactive groups, such as oxygen, which tend to react with the ceric ion are undesirable and shoud be excluded, unless, as with the organic acids, they serve some added function.

As noted above, the plus four valence ceric ion is reduced to the plus three valence cerous ion during the reaction and must be re-oxidized before it is active for further reaction. The re-oxidation of the cerous to ceric ion can occur by any suitable method. One method is to re-oxidize the cerous ion after the reaction is over and the products separated. Re-oxidation can occur by electrolytic means, i.e., by inserting a lead, lead oxide, graphite or platinum anode and a cathode into the cerous ion solution (the cerous ion must be in solution in a solvent, such as a mineral acid-water) and then passing a current through the solution. For example, the attached figure shows the electrolytic oxidation of solutions of cerous nitrate and cerous sulfate in aqueous nitric acid and sulfuric acid, respectively, to the corresponding ceric salts by electrolytic oxidation under conditions shown on the figure using a platinum gauze electrode. As noted on the figure, substantially complete conversion of the cerous to the ceric salts was achieved.

On the other hand, re-oxidation can occur during the condensation reaction by the electrolytic method above. In this manner, lesser amounts of the tetravalent cerium salt need be employed since the cerous ion is being regenerated to the ceric ion continuously during the reaction.

The invention will be further described with reference to the following experimental work.

*Example 1*

In this run, 5.83 moles of glacial acetic acid, 0.75 mole of toluene and 0.2 mole of ceric ammonium nitrate were added to a 1-liter flask fitted with a condenser, thermometer and stirrer. Water (3.89 moles) was added to this mixture until the solution became clouded indicating the formation of a slight phase separation. The reaction mixture was rapidly stirred in an atmosphere of air while maintaining the reactants at 100° to 110° C. for about fifty-four hours. The reaction mixture was cooled and additional water added to cause a phase separation. Chromatographic analysis of the nonaqueous phase indicated the formation of 76 millimoles (hereinafter written mM.) of benzylacetate, 24 mM. of benzaldehyde and traces of dibenzyl. The calculated efficiency for formation of the ester was 76 percent. By efficiency is meant the mM. of desired product, i.e., diaryl compound which is actually formed, divided by the total mM. of desired product which theoretically should be formed, based on 100 percent conversion of the cerium salt.

*Example 2*

Example 1 was repeated except no water was added and the reaction time was 24 hours. Chromatographic analysis indicated the formation of 80 mM. of benzylacetate, 8 mM. of benzaldehyde and 12 mM. of dibenzyl.

The calculated efficiency for the formation of ester was 80 percent.

A comparison of Examples 1 and 2 shows that the addition of water (Example 1) substantially inhibits the formation of diaryl compounds. More benzaldehyde is produced in Example 1 than in Example 2 due to the longer exposure of the reactants to the air atmosphere.

*Example 3*

In this run, 0.25 mole of ceric sulfate, 0.5 mole of toluene, 1.67 moles of acetic acid, and 0.56 mole of water were added to a 500-milliliter flask fitted with a condenser, thermometer and stirrer. The contents of the reaction mixture was heated to 100° C. in an air atmosphere and maintained at that temperature for seven hours. The contents were cooled and the cerous salt was removed by filtration. Chromatographic analysis of the products indicated the formation of 110 mM. of benzylacetate, 10 mM. of benzaldehyde and less than 5 mM. of dibenzyl. The calculated efficiency for the formation of ester was 88 percent.

A comparison of Examples 1 and 3 shows that ceric sulfate is also useful as a catalyst for the subject reaction.

*Example 4*

In this run, 1.16 moles of ceric oxide, 5.45 moles of toluene and 1.67 moles of glacial acetic acid were added to a 1-liter flask fitted with a condenser, thermometer and stirrer. The reaction mixture was refluxed at 95° C. for six hours. Chromatographic analysis of the reaction mixture indicated no product formation.

Example 4 shows that ceric oxide is an unsuitable ceric salt for the process of this invention.

*Example 5*

In this run, 0.55 mole of ceric sulfate, 1.0 mole of toluene, 6.67 moles of glacial acetic acid and 0.5 mole of lithium acetate were added to a 1-liter flask fitted with a stirrer, condenser and thermometer. The reaction was run for eight hours at 90° to 100° C. in an air atmosphere. The products were cooled and an organic phase separated by the addition of 200 milliliters of water. Chromatographic analysis of the organic phase indicated the formation of 85 mM. of benzylacetate and 65 mM. of benzaldehyde. No dibenzyl was formed. The efficiency for the formation of the ester was calculated to be 57 percent.

Example 5 shows that the formation of diaryl compounds can be repressed in the subject reaction by the addition of a salt of an organic acid which, in this case, was lithium acetate.

*Example 6*

In this run, 0.25 mole of ceric ammonium nitrate, 0.5 mole of para-xylene, 5.0 moles of acetic acid, and 0.5 mole of water were added to a 1-liter flask fitted with a condenser, thermometer and stirrer. The reaction mixture was rapidly stirred for five hours at 90° C. The reaction mixture was then cooled and an organic phase separated by the addition of water. Chromatographic analysis of the organic phase indicated the production of 69 mM. of para-methylbenzylacetate and 2 to 3 mM. of paratolualdehyde. No diaryl compounds were observed. The calculated efficiency for the formation of the ester was 96 percent.

A comparison of Examples 1 and 6 shows that dialkylaromatics will also form esters with the suppression of diaryl compounds by the addition of water in accordance with the teaching of this invention.

*Example 7*

In this run, 1.89 moles of toluene, 0.177 mole of ceric ammonium sulfate, 16.7 moles of water and 2.5 moles of glacial acetic acid were introduced into a 1-liter flask fitted with a condenser, thermometer and stirrer. A two-phase system existed; the upper phase comprising toluene and the lower phase comprising water and acetic acid. The reaction was run for six hours at 90° C. with rapid mixing. The reaction mixture was cooled and analysis of the organic phase showed no product formation.

Example 7 shows that the amount of water inhibitor must be less than that amount which will result in the formation of two immiscible phases or else the desired reaction will not occur.

Resort may be had to such variations and modifications as fall within the spirit of the invention and the scope of the appended claims.

We claim:
1. A process for the selective production of esters which comprises contacting at least one alkyl-monocyclic aromatic compound having between 7 and 18 carbon atoms, said alkyl-monocyclic aromatic compound having between 1 and 4 alkyl groups, at least one of said alkyl groups having at least one hydrogen atom attached to a carbon atom which is directly connected to an aromatic ring, and which carbon atom also forms a part of said alkyl group, said alkyl group having between 1 and 10 carbon atoms and having no olefinic unsaturation between the alpha and beta carbon atoms of said alkyl group, the remaining open positions on said alkyl-monocyclic aromatic having substituents selected from the group consisting of hydrogen, halogen, $NO_2$ and $-C\equiv N$ with a promoter comprising a tetravalent cerium salt which has a water solubility at 25° C. of at least 0.05 gram per 100 grams of water and a monobasic organic acid selected from the group consisting of fatty acids having from 2 to 10 carbon atoms per molecule and chloroacetic acid under esterification conditions including a temperature between 60° and 300° C. and in the presence of an inhibitor selected from the group consisting of water and a soluble salt of an organic acid selected from the group consisting of the alkali metal, alkaline earth metal, and ammonium salts of a fatty acid having between 2 and 10 carbon atoms per molecule.

2. A process according to claim 1 wherein the cerium salt is ceric ammonium nitrate.

3. A process according to claim 1 wherein the cerium salt is ceric sulfate.

4. A process according to claim 1 wherein the alkyl-aromatic is selected from the group consisting of monoalkylaromatics represented by the formula:

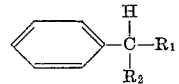

where $R_1$ and $R_2$ are selected from the group consisting of hydrogen, and hydrocarbon radicals having between one and 10 carbon atoms and dialkylaromatic represented by the formula:

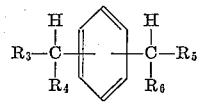

where $R_3$, $R_4$, $R_5$ and $R_6$ are selected from the group consisting of hydrogen and hydrocarbon radicals having between one and 10 carbon atoms.

5. A process according to claim 4 wherein the alkyl-aromatic is toluene and the cerium salt is ceric ammonium nitrate.

6. A process for the selective production of esters which comprises contacting at least one alkyl-monocyclic aromatic compound having between 7 and 18 carbon atoms, said alkyl-monocyclic aromatic compound having between 1 and 4 alkyl groups, at least one of said alkyl groups having at least one hydrogen atom attached to a carbon atom which is directly connected to an aromatic ring, and which carbon atom also forms a part of said alkyl group, said alkyl group having between 1 and 10 carbon atoms and having no olefinic unsaturation between the alpha and beta carbon atoms of said alkyl group, the remaining open positions on said alkyl-monocyclic aromatic having substituents selected from the group consisting of hydrogen, halogen, NO$_2$ and —C≡N with a promoter comprising a tetravalent cerium salt which has a water solubility at 25° C. of at least 0.05 gram per 100 grams of water and a monobasic organic acid selected from the group consisting of fatty acids having from 2 to 10 carbon atoms per molecule and chloroacetic acid under esterification conditions including a temperature between 60° and 300° C. and in the presence of at least two weight percent water based on the organic acid but less than that amount of water which would result in the formation of two immiscible liquid phases.

7. A process according to claim 6 wherein the alkyl-aromatic is selected from the group consisting of monoalkylaromatics represented by the formula:

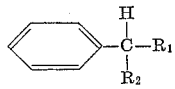

where R$_1$ and R$_2$ are selected from the group consisting of hydrogen, and hydrocarbon radicals having between one and 10 carbon atoms; and dialkylaromatics represented by the formula:

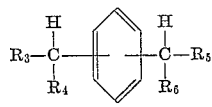

where R$_3$, R$_4$, R$_5$ and R$_6$ are selected from the group consisting of hydrogen and hydrocarbon radicals having between one and 10 carbon atoms.

8. A process according to claim 7 wherein the alkyl-aromatic is toluene and the cerium salt is ceric ammonium nitrate.

9. A process for the selective production of esters which comprises contacting at least on alkyl-monocyclic aromatic compound having between 7 and 18 carbon atoms, said alkyl-monocyclic aromatic compound having between 1 and 4 alkyl groups, at least one of said alkyl groups having at least one hydrogen atom attached to a carbon atom which is directly connected to an aromatic ring, and which carbon atom also forms a part of said alkyl group, said alkyl group having between 1 and 10 carbon atoms and having no olefinic unsaturation between the alpha and beta carbon atoms of said alkyl group, the remaining open positions on said alkyl-monocyclic aromatic having substituents selected from the group consisting of hydrogen, halogen, NO$_2$ and —C≡N with a promoter comprising a tetravalent cerium salt which has a water solubility at 25° C. of at least 0.05 gram per 100 grams of water and a monobasic organic acid selected from the group consisting of fatty acids having from 2 to 10 carbon atoms per molecule and chloroacetic acid under esterification conditions including a temperature between 60° and 300° C. and in the presence of between 0.1 to 10 moles per mole of organic acid of a soluble salt of a organic acid selected from the group consisting of the alkali metal, alkaline earth metal, and ammonium salts of a fatty acid having between 2 and 10 carbon atoms per molecule.

10. A process according to claim 9 wherein the soluble salt is lithium acetate.

11. A process for the preparation of benzylacetate which comprises contacting toluene with acetic acid in the presence of added lithium acetate and ceric sulfate under esterification conditions including a temperature between 60° and 300° C.

12. A process for the preparation of para-methylbenzyl acetate which comprises contacting para-xylene with acetic acid under esterification conditions including a temperature between 60° and 300° C. in the presence of a promoter comprising a tetravalent cerium salt which has a water solubility at 25° C. of at least 0.05 gram per 100 grams of water and in the presence of at least two weight percent water based on the acetic acid.

13. A process according to claim 12 wherein the tetravalent cerium salt is selected from the group consisting of ceric sulfate, ceric nitrate, ceric ammonium sulfate and ceric ammonium nitrate.

14. A process for the selective production of an ester which comprises:
  contacting at least one alkyl-monocyclic aromatic compound having between 7 and 18 carbon atoms, said alkyl-monocyclic aromatic compound having between 1 and 4 alkyl groups, at least one of said alkyl groups having at least one hydrogen atom attached to a carbon atom which is directly connected to an aromatic ring, and which carbon atom also forms a part of said alkyl group, said alkyl group having between 1 and 10 carbon atoms and having no olefinic unsaturation between the alpha and beta carbon atoms of said alkyl group, the remaining open positions on said alkyl-monocyclic aromatic having substituents selected from the group consisting of hydrogen, halogen, NO$_2$ and —C≡N;
  with a fatty acid having from 2 to 10 carbon atoms per molecule;
  in the presence of a promoter comprising a tetravalent cerium salt selected from the group consisting of ceric sulfate, ceric nitrate, ceric ammonium sulfate and ceric ammonium nitrate;
  under esterification conditions including a temperature between 60° and 300° C.; and
  in the further presence of an inhibitor selected from the group consisting of water; and
  a soluble salt of an organic acid selected from the group consisting of the alkali metal, alkaline earth metal, and ammonium salts of a fatty acid having between 2 and 10 carbon atoms per molecule.

15. A process according to claim 14 wherein the alkyl-aromatic is selected from the group consisting of monoalkylaromatic is selected from the group consisting of monoalkylaromatics represented by the formula:

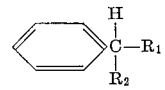

where R$_1$ and R$_2$ are selected from the group consisting of hydrogen, and hydrocarbon radicals having between one and 10 carbon atoms; and dialkylaromatics represented by the formula:

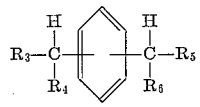

where R$_3$, R$_4$, R$_5$ and R$_6$ are selected from the group consisting of hydrogen and hydrocarbon radicals having between one and 10 carbon atoms.

16. A process according to claim 15 wherein the inhibitor is at least two weight percent water based on said organic acid but less than that amount of water which would result in the formation of two immiscible phases.

17. A process according to claim 15 wherein the inhibitor is from 0.1 to 10 moles per mole of said organic acid of a soluble salt of an organic acid selected from the group consisting of alkali, alkaline earth metal, and ammonium salts of a fatty acid having between 2 and 10 carbon atoms per molecule.

18. A process according to claim 17 wherein the soluble salt is lithium acetate.

19. A process according to claim 15 wherein the alkyl-aromatic is toluene.

20. A process according to claim 15 wherein the alkylaromatic is p-xylene.

References Cited

UNITED STATES PATENTS 3,047,616   7/1962   Blair et al. _____ 260—599

FOREIGN PATENTS 640,184   4/1962   Canada.

RICHARD K. JACKSON, *Primary Examiner.*

V. GARNER, *Assistant Examiner.*

UNITED STATES PATENT OFFICE
CERTIFICATE OF CORRECTION

Patent No. 3,346,622                      October 10, 1967

Charles M. Selwitz et al.

It is hereby certified that error appears in the above numbered patent requiring correction and that the said Letters Patent should read as corrected below.

Column 2, lines 3 to 7, the formula should appear as shown below instead of as in the patent:

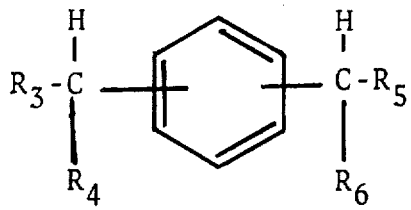

column 3, line 74, for "iron" read -- ion --; column 7, line 39, for "on" read -- one --.

Signed and sealed this 22nd day of October 1968.

(SEAL)
Attest:

EDWARD M. FLETCHER, JR.                  EDWARD J. BRENNER
Attesting Officer                           Commissioner of Patents